United States Patent [19]
Fisher et al.

[11] 3,835,720
[45] Sept. 17, 1974

[54] ENDLESS POWER TRANSMISSION BELT AND METHOD OF MAKING SAME

[75] Inventors: David G. Fisher; Jerry W. Hill, both of Springfield, Mo.

[73] Assignee: Dayco Corporation, Dayton, Ohio

[22] Filed: Aug. 10, 1973

[21] Appl. No.: 387,420

[52] U.S. Cl.............................................. 74/231 C
[51] Int. Cl............................................. F16g 1/28
[58] Field of Search................... 74/231 C, 233, 234

[56] References Cited
UNITED STATES PATENTS

| | | | |
|---|---|---|---|
| 3,416,383 | 12/1968 | Jensen et al. | 74/233 |
| 3,736,805 | 6/1973 | Dent | 74/231 C |
| 3,738,187 | 6/1973 | Hisserich | 74/231 C |

Primary Examiner—Leonard H. Gerin

[57] ABSTRACT

An endless power transmission belt and method of making same is provided wherein such belt is adapted to be operated in an endless path and comprises a tension section, a load-carrying section, and a compression section having a plurality of teeth arranged transverse the endless path with each of the teeth having a plurality of parallel randomly dispersed strength members each extending completely across its associated tooth with the randomly dispersed members increasing the transverse rigidity of the belt as well as providing nonsymmetrical patterns for the strength members which tend to prevent the development of shear planes and thereby prevent premature belt failure.

20 Claims, 15 Drawing Figures

PATENTED SEP 17 1974 3,835,720

ENDLESS POWER TRANSMISSION BELT AND METHOD OF MAKING SAME

BACKGROUND OF THE INVENTION

Toothed endless power transmission belts are in wide use throughout industry and these toothed belts may be categorized in two broad categories. The first category includes belts having high flexibility enabling them to be operated around comparatively small diameter sheaves; however, these belts do not have adequate transverse rigidity whereby the top portions thereof tend to become outwardly concave as they engage their associated sheaves resulting in poor performance and premature belt failure. The second category of these toothed belts provide the required transverse rigidity by either utilizing high concentrations of stiffening particles in each tooth or these belts use numerous strength members which are arranged in clearly defined symmetrical patterns in each tooth whereby the belts with the high concentrations of particles are generally too stiff for optimum performance and the belts with the symmetrical strength members in each tooth result in shear planes being defined and with operation of the belts around associated sheaves the belts tend to fail prematurely along these shear planes. In addition, belts using symmetrically arranged strength members in each tooth tend to wear associated sheaves in concentrated concentric wear patterns.

SUMMARY

This invention provides an endless power transmission belt, and method of making same, wherein such belt is adapted to be operated in an endless path and comprises a tension section, a load-carrying section, and a compression section having a plurality of teeth arranged transverse the endless path with each of the teeth having a plurality of parallel randomly dispersed strength members each extending completely across its associated tooth with the randomly dispersed strength members providing nonsymmetrical patterns therefor and assuring belt flexibility while increasing the transverse rigidity of the belt. The nonsymmetrical patterns of these strength members tend to prevent the development of shear planes which would tend to cause premature belt failure as the belt operates in associated sheaves; and, such nonsymmetrical patterns also assure the elimination of concentrated concentric wear patterns in the sheaves.

Other details, uses, and advantages of this invention will be readily apparent from the exemplary embodiments thereof presented in the following specification, claims, and drawings.

BRIEF DESCRIPTION OF THE DRAWINGS

The accompanying drawings show an exemplary embodiment of this invention, in which.

DESCRIPTION OF ILLUSTRATED EMBODIMENT

Figure 13:
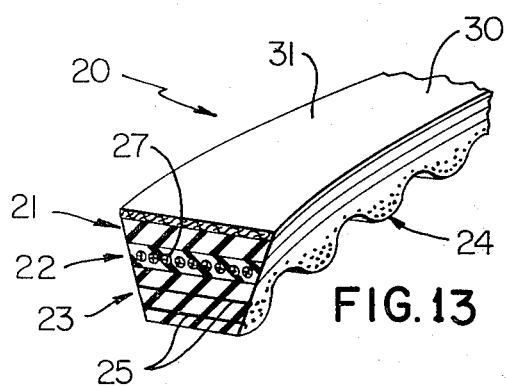
FIG. 13 is a fragmentary perspective view of a completed toothed belt of this invention with the front portion thereof being illustrated in cross section.

Reference is now made to FIG. 13 of the drawings which illustrates one exemplary embodiment of a toothed power transmission belt of this invention which is particularly adapted to be operated in an endless path and such belt is designated generally by the reference numeral 20. The belt 20 comprises a tension section 21, a load-carrying section 22, and a compression section 23 which has a plurality of teeth 24 each of which is arranged transverse the endless path of the belt, i.e., transverse the longitudinal axis of belt 20; and, in this example each tooth 24 is arranged perpendicular to the endless path of the belt.

Each tooth 24 of the belt 20 has a plurality of parallel randomly dispersed strength members each designated by the same reference numeral 25 and the strength members 25 increase the transverse rigidity of the belt 20 while allowing the belt 20 to have great flexibility whereby such belt may be operated in comparatively small diameter sheaves. The randomly dispersed parallel members are arranged in nonsymmetrical patterns which tend to prevent the development of shear planes as the belt 20 is moved in its associated sheaves to thereby prevent premature belt failure.

Figure 3:
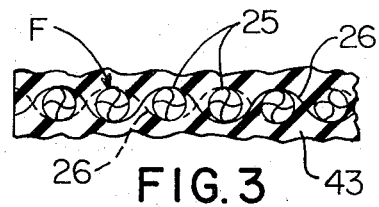
FIG. 3 is an enlarged fragmentary cross-sectional view particularly illustrating the initial arrangement of the strength members and the weak tie strands in one typical layer of the tire cord fabric with the associated sheet positioned as shown in FIG. 1.
Figure 4:
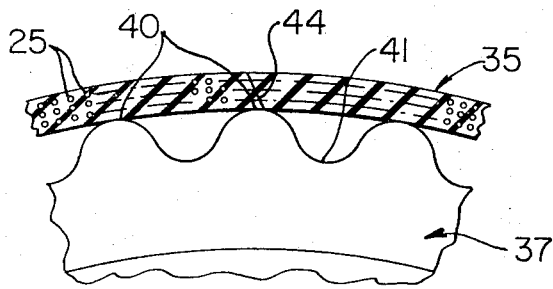
FIGS. 4–10 are enlarged end views of a fragmentary portion of the build-up cylinder or drum shown in FIG. 1 and illustrating additional steps used in making the belt of this invention.

The strength members 25 are strength members originally comprising so-called tire cord fabric and a fragment of such fabric is shown in FIG. 3 and designated by the reference letter F and the strength members of fabric F are also designated by the reference numerals 25. The fabric F also has weak tie strands 26 called "picks" 26 in the textile industry which ordinarily hold the strength members 25 in parallel relation. Some of the picks or weak tie strands 26 are broken in the process of making the belt 20 as will be readily apparent from FIG. 15 which shows certain strands 26 broken which allows the members 25 to move within each tooth 24 and in a random parallel arrangement as best shown in FIGS. 13 and 14.

Figure 14:
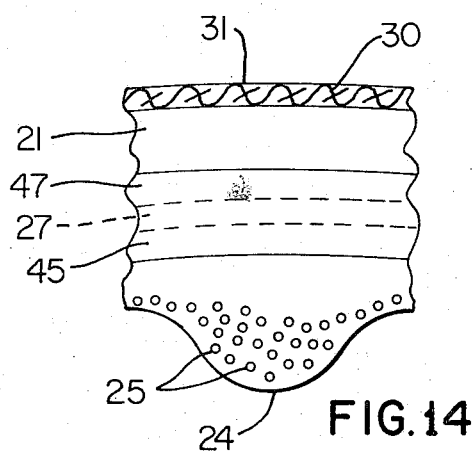
FIG. 14 is an enlarged view of a typical tooth of the belt of FIG. 13 looking toward the side of the belt with the tooth drawn to an enlarged scale and particularly illustrating the random arrangement of the strength members each of which extends completely across its tooth.
Figure 15:
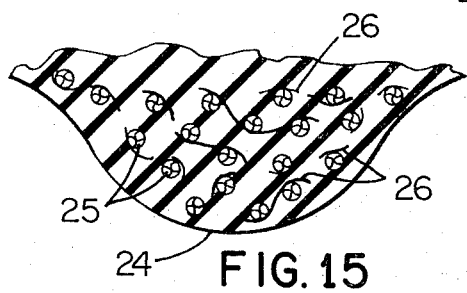
FIG. 15 is a greatly enlarged fragmentary cross-sectional view particularly illustrating the final random arrangement of the strength members in a typical tooth of the completed belt of FIG. 13 and also showing that certain tie strands are broken thereby making possible the random arrangement.

Each of the strength members 25 is made of a substantially inextensible cord and when each of the teeth is viewed on a cross section parallel to the longitudinal axis of the belt 20 or from an end thereof, as shown in FIG. 14, for example, the members 25 define between roughly 15 and 95 percent of the corresponding cross-sectional area of each tooth 24. Stated otherwise, the inextensible strength members 25 occupy between roughly 15 and 95 percent of the volume of each tooth 24. Preferably, the strength members 25 occupy an area, when viewed on the above-described cross section, which is in the range of 20 to 40 percent of the total area of the associated tooth 14; and, again stating this concept otherwise, the strength members 25 preferably occupy between 20 and 40 percent of the total volume of each tooth 24 and in one application of this invention strength members 25 occupying 30 percent of the volume of each tooth 24 gave excellent results.

The belt 20 is made primarily of an elastomeric material and the load-carrying section 22 is preferably defined by a comparatively inextensible load-carrying cord 27 which is wound in a helical pattern. The load-carrying cord 27 may be made of any suitable material known in the art and is preferably made of a material which shrinks partially when a belt sleeve from which the belt 20 is made is vulcanized or cured in a known manner.

The belt 20 also has a top cover layer 30 bonded against the tension section 21; and, the cover 30 may be made of a suitable fabric, or the like, which has a coating of an elastomeric material 31 provided on its top surface.

The toothed belt 20 is preferably made utilizing certain method steps including the ones illustrated in FIGS. 1 and 4-10 as will now be described in detail. In particular, a sheet 35 of tire cord fabric is provided and as will be readily apparent from FIG. 2 such sheet is comprised of a plurality of three layers of tire cord fabric and each layer is designated by the reference letter F. Each layer F is comprised of a plurality of parallel strength members which for easy correlation with the completed belt 20 will be given the reference numerals 25 as in the belt 20 and the strength members 25 are held together by picks or weak tie strands each also designated by the reference numeral 26 as in the completed belt 20; and, the strength member 25 and weak tie strands 26 are woven together to define the tire cord fabric F in accordance with techniques which are well known in the art.

The sheet 35 is wound around a forming member in the form of a cylinder or drum which is designated generally by the reference numeral 37 and the forming member 37 has alternating longitudinally extending parallel projections 40 and grooves 41 which are arranged parallel to a central longitudinal axis 42 of the forming cylinder 37.

The manner in which the sheet 35 is wrapped in position will be described in detail subsequently.

Figure 2:
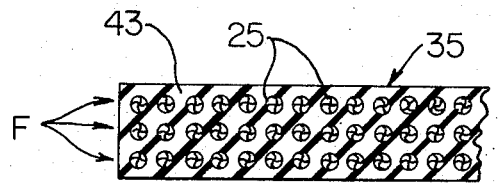
FIG. 2 is an enlarged fragmentary cross-sectional view particularly illustrating that a sheet of tire cord fabric shown in the step of FIG. 1 is made of three layers.
Figure 1:
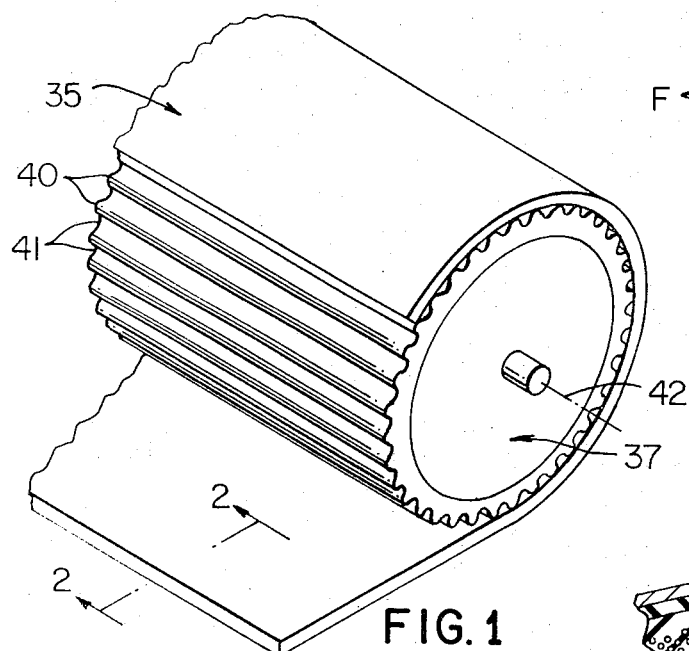
FIG. 1 is a fragmentary perspective view illustrating a first step in the method of making the improved toothed belt of this invention.

As seen particularly in FIG. 2 of the drawings, the three parallel layers of tire cord fabric F are bound together by a suitable elastomeric matrix material 43 which serves as a carrier, base, or matrix for the strength members 25 and it will be seen from FIG. 3 that the elastomeric material 43 defines at least one outside surface of the sheet 35. In this example, the elastomeric material 43 defines the top and bottom surfaces of the sheet 35 as well as being provided between the various fabric layers F.

The sheet 35 is wrapped in position around the forming cylinder 37 so that the parallel strength members 25 comprising the various layers F are arranged parallel to the projections 40 and hence the grooves 41 and for reasons which will be explained in more detail subsequently. The opposite ends of the sheet 35 are preferably cut at cooperating angles so that they may be placed in abutting relation to form a beveled splice 44 once the sheet 35 has been wrapped completely around the cylinder 37, see FIG. 4.

Figure 5:
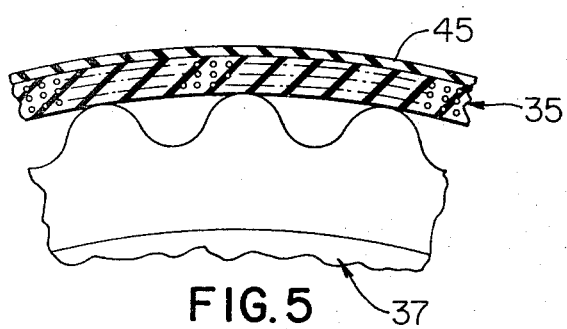

After the sheet 35 has been wrapped in position on the forming cylinder 37, what will be referred to as a bottom cushion 45 is wrapped against and concentrically around the sheet 35 in the manner illustrated in FIG. 5. The bottom cushion 45 may be in the form of a single layer of a comparatively soft elastomeric material.

After the bottom cushion 45 has been suitably wrapped in position against the sheet 35, a load-carrying material preferably in the form of a load-carrying cord is wrapped or wound against the bottom cushion 45 and such load-carrying cord will be designated by the reference numeral 27 to correspond to the load-carrying cord of the completed belt 20. The load-carrying cord is preferably made of an inextensible material capable of being wound in position while under substantial tension; and, the load-carrying cord 27 is wound in a helical pattern and the tension applied thereon is sufficiently great that portions of the sheet 35 are urged within grooves 41 of the forming cylinder 37 as illustrated at a few typical locations 46 in FIG. 6. The amount of tension held on the load-carrying cord will vary depending on the constituents of the sheet 35 including its layers of tire cord fabric F and the physical properties of the elastomeric matrix 43.

Figure 7:
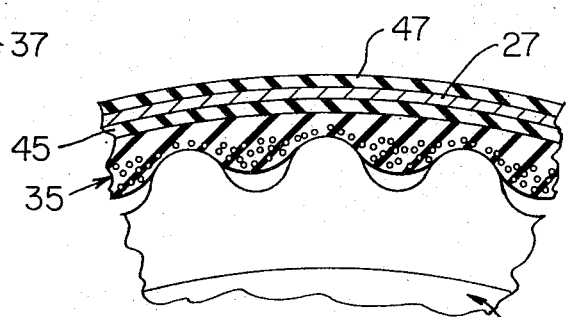
Figure 8:
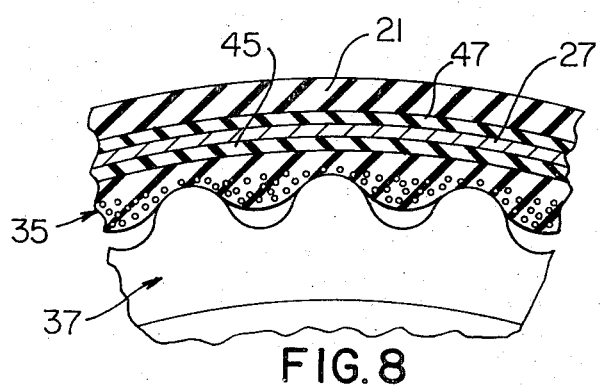

Once the load-carrying cord 27 has been wound in position, a top cushion 47 made of a layer of a suitable elastomeric material, which is preferably the same material used to make the bottom cushion 45, is wrapped against the load-carrying cord 27 in the manner illustrated in FIG. 7. The bottom cushion 45 and the top cushion 47 may each be defined by one or more layers of elastomeric material and such cushions cooperate with the load-carrying cord 27 to define the load-carrying section in the completed belt 20.

After the top cushion 47 is wrapped in position, an outer layer or sheet of elastomeric material is wrapped against the top cushion 47 (see FIG. 8) and such sheet is designated by the reference numeral 21 to correspond to the tension section of belt 20 inasmuch as sheet 21 defines the tension section 21 of the completed belt 20. The sheet 21 may be made of one or more layers of an elastomeric material having different properties than the other materials and the elastomeric material of such sheet is particularly adapted to take the severe stretching thereof which occurs in a tension section of a V-belt.

Figure 9:
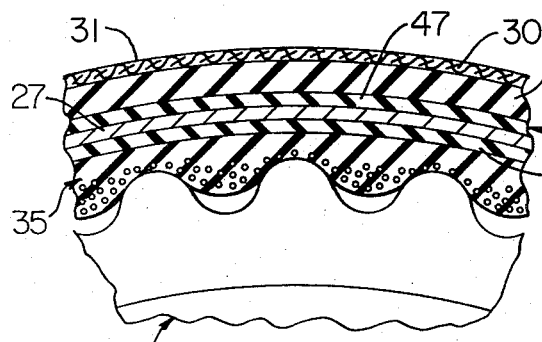

After wrapping the sheet 21 of the elastomeric material around the top cushion 47 a top cover layer is wrapped in position against the outside surface of layer 21, as shown in FIG. 9, and this top cover layer is designated by the reference numeral 30 as in the completed belt 20. The cover layer 30 may be made of any suitable material known in the art including a woven fabric and preferably has a layer or coating of elastomeric material 31 suitably provided on its top surface. Thus, after wrapping the cover layer 30 in position it will be seen that an assembly of materials is provided in the form of an uncured or unvulcanized sleeve which will be designated by the general reference numeral S.

The uncured sleeve S while being supported on the cylinder 37 is then vulcanized or cured in accordance with techniques which are well known in the art. For example, the cylinder and its built-up sleeve S are placed in a mold and steam at controlled temperatures and pressures is introduced in the mold to cure the sleeve S. As the sleeve S is cured portions of the sheet 35 are urged further into the grooves 41 in the manner illustrated at the typical locations 50 shown in FIG. 10.

Figure 6:
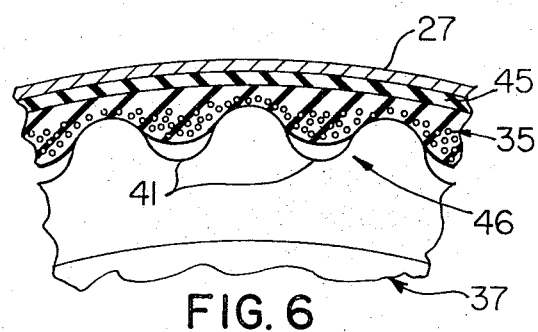
Figure 10:
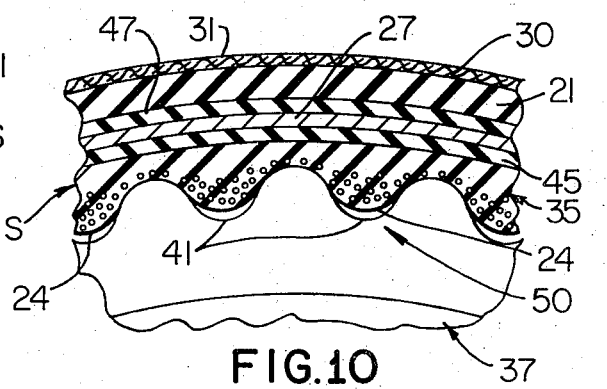
Figure 11:
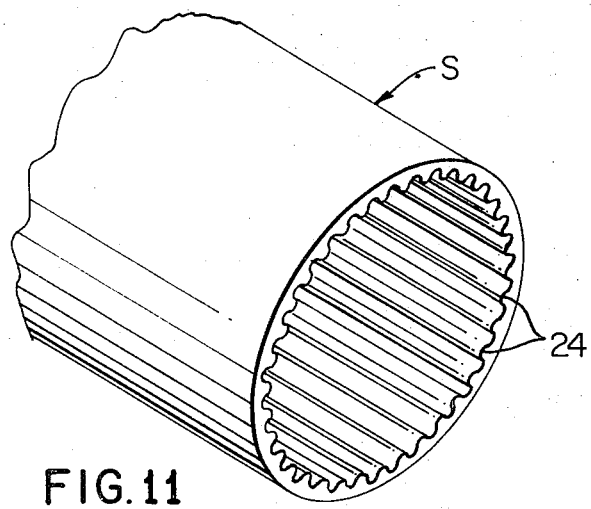
FIG. 11 is a fragmentary perspective view particularly illustrating a toothed belt sleeve stripped from the build-up cylinder of FIG. 1 after curing the assembly of components.

Thus, it will be seen that the winding of the load-carrying cord 27 in the manner explained in connection with FIG. 6 cooperating with the curing of the sleeve S as described above result in the cured sleeve S illustrated in FIG. 10 having portions which have been urged radially inwardly against the cylinder 37 so that the sheet portion 35 of sleeve S substantially fills the grooves 41 to define teeth in the cured sleeve S, shown in FIGS. 10 and 11, and such teeth will be designated by the same reference numeral 24 as the teeth 24 of belt 20.

During this filling of the grooves 41 the elastomeric material 43 comprising the sheet 35 serves as a matrix allowing floating movement of the strength member 25 within the grooves 41 in a random manner. Further, as the members 25 float within the grooves 41 either by the action of the winding of load-carrying cord 27 and/or the process of curing the completed uncured sleeve S great forces are imposed on certain ones of the picks or weak tie strands 26 holding the various strength members 25 of each layer of tire cord fabric F. These great forces on certain tie strands 26 cause them to break thereby allowing the strength members 25 to move out of their normal positions and be randomly dispersed in the grooves 41.

The cured sleeve S and cylinder 37 are then cooled in accordance with well known techniques whereupon the cooled sleeve S is suitably stripped from its cylinder 37.

Figure 12:
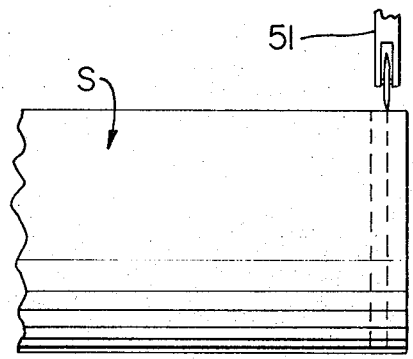
FIG. 12 is a fragmentary side view of the belt sleeve of FIG. 11 and illustrating the manner in which individual toothed belts may be cut from such sleeve with a typical cutting device.

The cured and cooled sleeve S is then suitably supported on a supporting mandrel of conventional construction and cut using a cutter 51 which may be in the form of a conventional rotary cutter, or the like (FIG. 12). The cured and cooled sleeve is cut by the cutter 51 to define a plurality of belts 20 each having a substantially trapezoidal cross-sectional configuration and as illustrated in FIG. 13 of the drawings. Once the belts 20 are cut, it will be seen from FIG. 13 that each strength member 25 in each tooth 24 of each belt extends completely across the associated tooth.

In this disclosure of the invention, a plurality of three layers of tire cord fabric F are shown as comprising the sheet 35; however, it is to be understood that as few as one layer or any desired number of layers may comprise the sheet 35.

It will also be appreciated that the size and/or concentration of the strength members 25 in each layer of tire cord fabric F may be varied as desired so that the number of strength members urged within each groove 41 and the volume they occupy can be precisely controlled. This control of the randomly dispersed strength members enables the compression section 23 of each belt 20 to be made so that the strength members 25 may comprise between 15 and 95% of the total volume of each tooth 24 in such compression section of each belt 20. As previously described in connection with the belt 20 the strength members preferably comprise between 20 and 40% of the total volume of each tooth 24.

The load-carrying cord 27 may be made of any suitable material used in the belt industry including, but not being limited to, materials such as nylon, rayon, polyester, fiberglass and the like. Preferably the cord 27 is made of a material which when subjected to a conventional curing process as described above will result in shrinking thereof so as to urge portions of the sheet 35 further within the grooves 41 of cylinder 37 as shown at 50 in FIG. 10.

Any suitable elastomeric material may be used to make the various component layers or sheets of the sleeve S and hence belt 20; and, it will be appreciated that natural and synthetic rubber compounds may be used as well as any suitable plastic material.

The belt 10 of this example is shown as having a cover provided only on its top surface; however, if desired a belt in accordance with the teachings of this invention may be provided with a cover on its bottom or toothed surface.

The layers of tire cord fabric F used to define the sheet 35 may be made with various materials known in the art comprising the strength members 25 and weak tie strands 26. As previously mentioned, the members 25 are preferably made of continuous substantially inextensible cords. Each cord or member 25 may be made of a single strand or of a plurality of twisted strands of suitable material, as desired.

While present exemplary embodiments of this invention, and methods of practicing the same, have been illustrated and described, it will be recognized that this invention may be otherwise variously embodied and practiced within the scope of the following claims.

What is claimed is:

1. An endless power transmission belt adapted to be operated in an endless path and comprising, a tension section, a load-carrying section, and a compression section having a plurality of teeth arranged transverse said endless path, each of said teeth having a plurality of parallel randomly dispersed strength members each extending completely across its associated tooth, said randomly dispersed members increasing the transverse rigidity of said belt as well as providing nonsymmetrical patterns for said strength members which tend to prevent the development of shear planes and thereby prevent premature belt failure.

2. A belt as set forth in claim 1 in which each of said strength members is made of a substantially inextensible cord.

3. A belt as set forth in claim 1 and further comprising a top cover bonded against said tension section.

4. A belt as set forth in claim 2 in which each of said teeth when viewed on a cross-sectional plane parallel to the running plane of the belt has said strength members therein which define between 15 and 95% of the cross-sectional area thereof.

5. A belt as set forth in claim 2 in which each of said teeth when viewed on a cross-sectional plane parallel to the running plane of the belt has said strength members which define between 20 to 40% of the cross-sectional area thereof.

6. A belt as set forth in claim 1 in which said sections of said belt are made primarily of elastomeric material.

7. A belt as set forth in claim 1 in which said teeth have broken tie strands therein extending transverse the strength members, said broken tie strands allowing said strength members to move to their randomly dispersed positions.

8. A belt as set forth in claim 4 having a substantially trapezoidal cross-sectional configuration.

9. A belt as set forth in claim 1 in which said load-carrying section comprises a substantially inextensible helically wound load-carrying cord.

10. A belt as set forth in claim 9 in which each tooth has an arcuate apex.

11. A method of making endless power transmission belts comprising the steps of, providing a sheet of tire cord fabric having strength members and transversely arranged weak tie strands loosely holding said strength members in spaced relation and having an elastomeric material defining at least one surface of said sheet, placing said sheet around a cylindrical forming member having alternating longitudinally extending parallel projections and grooves with said strength members arranged substantially parallel to said projections and with said elastomeric material against said forming member, winding a load-carrying material around said sheet, wrapping a layer of elastomeric material around said load-carrying material, curing the assembly of materials placed around said forming member, said winding and curing steps serving to urge said sheet against said forming member so that it substantially fills said grooves while said elastomeric material of said sheet serves as a matrix allowing floating movement of said strength members within said grooves in a random manner while breaking some of the tie strands to thereby form teeth in said sheet having said strength members randomly dispersed in each tooth, and cutting the cured assembly of materials to define a plurality of said endless belts each having a plurality of transverse teeth with each tooth having a plurality of parallel randomly dispersed strength members each extending completely across its associated tooth.

12. A method as set forth in claim 11 in which said providing step comprises providing said sheet having a plurality of parallel layers of said tire cord fabric held together as a unit by said elastomeric material.

13. A method as set forth in claim 12 in which each of said layers of tire cord fabric has said elastomeric material defining opposed surfaces thereof.

14. A method as set forth in claim 11 in which said winding step comprises winding said load-carrying material in the form of a load-carrying endless cord.

15. A method as set forth in claim 14 in which said winding step comprises winding said load-carrying cord in a helical pattern against said sheet, said cord being substantially inextensible and being made of a material which shrinks in length during said curing step and thereby helps urge said sheet against said forming member.

16. A method as set forth in claim 14 and including the further steps of wrapping a bottom cushion made of an elastomeric material against said sheet prior to said winding step and said winding step comprises winding said load-carrying material against said bottom cushion.

17. A method as set forth in claim 16 and including the further steps of wrapping a top cushion made of an elastomeric material against said load-carrying cord prior to said step of wrapping said layer of elastomeric material, and said step of wrapping said layer of elastomeric material comprises wrapping said layer of elastomeric material against said top cushion, said top and bottom cushions cooperating with said load-carrying cord to define a load-carrying section for each of said endless belts.

18. A method as set forth in claim 17 and comprising the further step of applying a cover material against said layer of elastomeric material after wrapping step thereof.

19. A method as set forth in claim 11 in which said providing step comprises providing said sheet of tire cord fabric having said strength members which during said winding and curing steps move within said grooves and form said teeth, said strength members being such that they define between 15 and 95% of the volume of their associated teeth.

20. A method as set forth in claim 11 in which said providing step comprises providing said sheet of tire cord fabric having said strength members which during said winding and curing steps move within said grooves and form said teeth, said strength members being such that they define roughly 30% of the volume of their associated teeth.

* * * * *